July 21, 1953 P. BAKKER 2,646,466

CONNECTOR SWITCH

Filed Oct. 1, 1949 4 Sheets-Sheet 1

INVENTOR.
PIER BAKKER

BY *Chas. W. Carley*

ATTORNEY

CONNECTOR SWITCH

Filed Oct. 1, 1949 4 Sheets-Sheet 2

INVENTOR.
PIER BAKKER

BY

ATTORNEY

CONNECTOR SWITCH

Filed Oct. 1, 1949

INVENTOR.
PIER BAKKER

BY Chas. W. Cady

ATTORNEY

CONNECTOR SWITCH

Filed Oct. 1, 1949

4 Sheets-Sheet 4

INVENTOR.
PIER BAKKER

BY

[signature]

ATTORNEY

Patented July 21, 1953 2,646,466

UNITED STATES PATENT OFFICE 2,646,466

CONNECTOR SWITCH

Pier Bakker, Chicago, Ill., assignor to Automatic Electric Laboratories, Inc., Chicago, Ill., a corporation of Delaware Application October 1, 1949, Serial No. 119,082

10 Claims. (Cl. 179—18)

This invention relates to automatic telephone systems in general, and more particularly to small systems of the type commonly known as unattended automatic community exchanges.

These systems as a rule are privately owned by individuals or small commercial groups and are installed in small communities, often rural, for providing local service between the local subscribers as well as connections over trunk lines to other nearby communities and to a main office for long distance switching into the telephone company's network.

The object of this invention is to provide improved means employing a minimum amount of switching equipment to complete the desired connections and which is adapted to economical manufacture, yet provide all the features incumbent in a modern, high class, dependable wire communications system.

One of the features of this invention relates to marking means for marking on the connector switch the subscriber group desired by dialing the tens digit and for selecting the desired ringing code assigned to the desired party on the called line.

Another feature of the invention is that this same marking means is utilized for the marking a trunk call on the connector banks.

Still another feature of the invention is the utilization of this marking means for providing a common overflow trunk for two trunk groups.

A further feature of this invention is provision for supervision available to a toll operator by a sixty interruption per minute flash busy.

Other features, together with those hereinbefore recited will be fully explained hereinafter, reference being had to the accompanying drawings comprising Figs. 1 to 7 in which.

Figure 3:
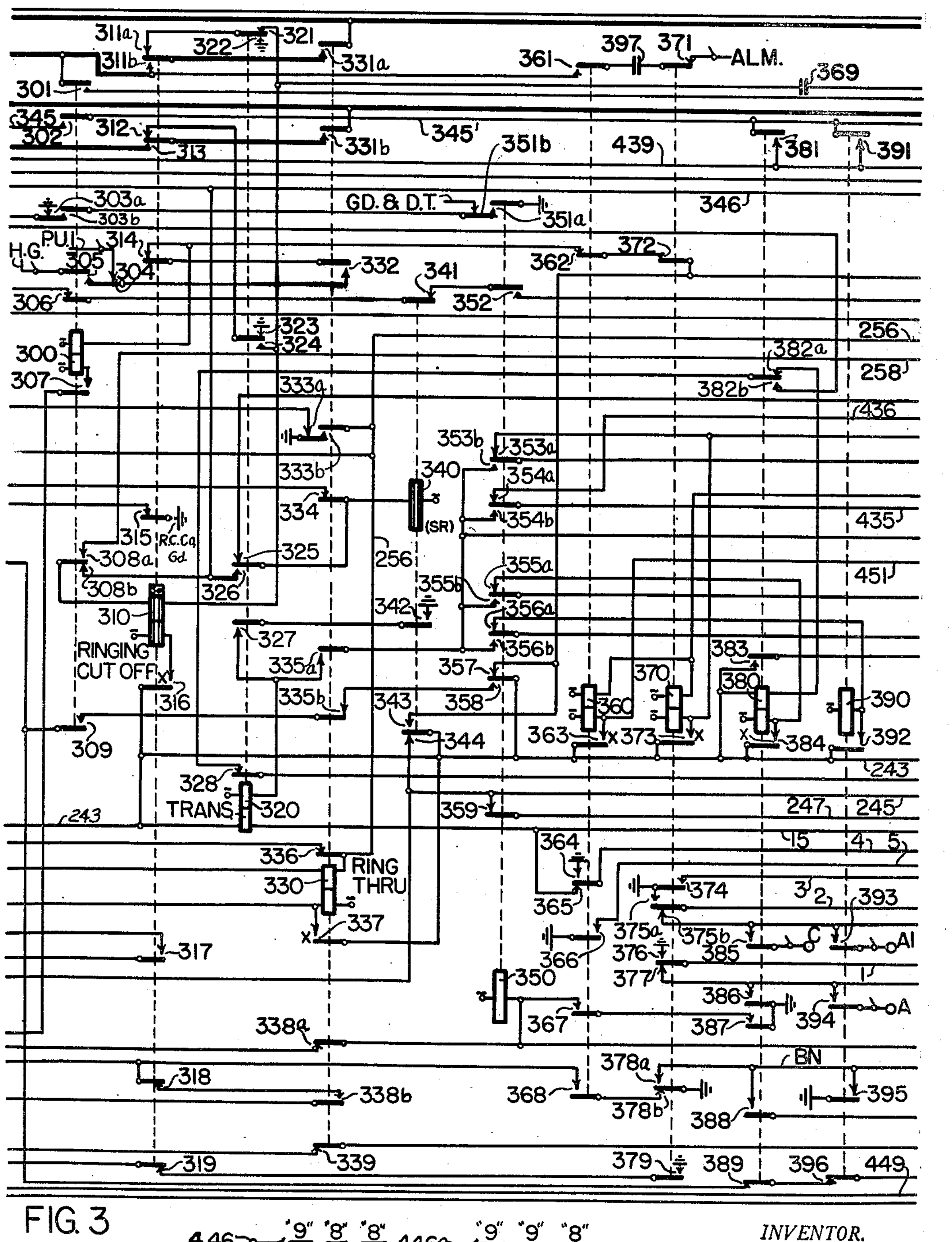
Figure 4:
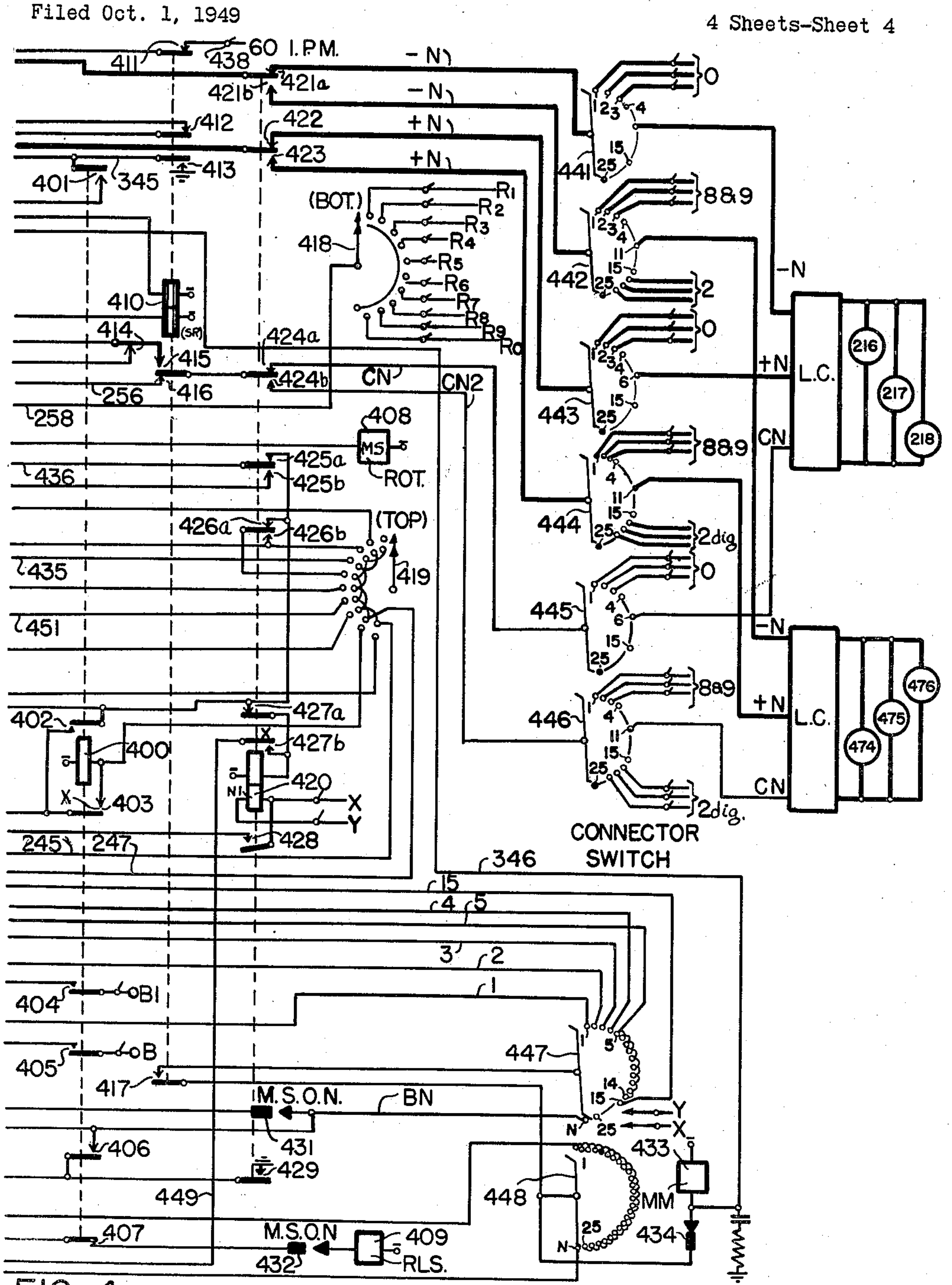

Fig. 4 shows the position of a two-bank ten-point minor switch in a single finder-connector link, which switch is used to mark predetermined points on the connector banks as well as to select the ringing code for a party line. Also shown in Fig. 4 is an eight-bank twenty-five-point rotary connector switch which taken in conjunction with the line finder in Fig. 1, relays in Figs. 2 and 3, and relays and minor switch in Fig. 4 comprises one of the six finder-connector links in the system. At the extreme right in Fig. 4 is also shown the line equipment for two party lines.

Figure 5:
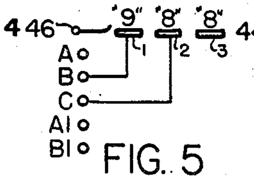
Figure 6:
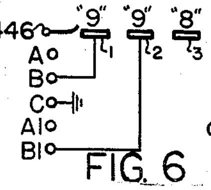

Figs. 5 and 6 show two possible wiring arrangements of the first three connector bank contacts accessible to wiper 446 for an overflow trunk for a single and a multiple trunk group.

Figure 7:
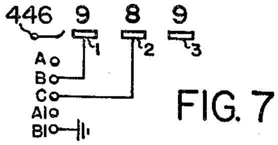

Fig. 7 is a wiring scheme of the first three connector bank contacts of wiper 446 providing a common overflow trunk for two-trunk groups.

Figure 1:
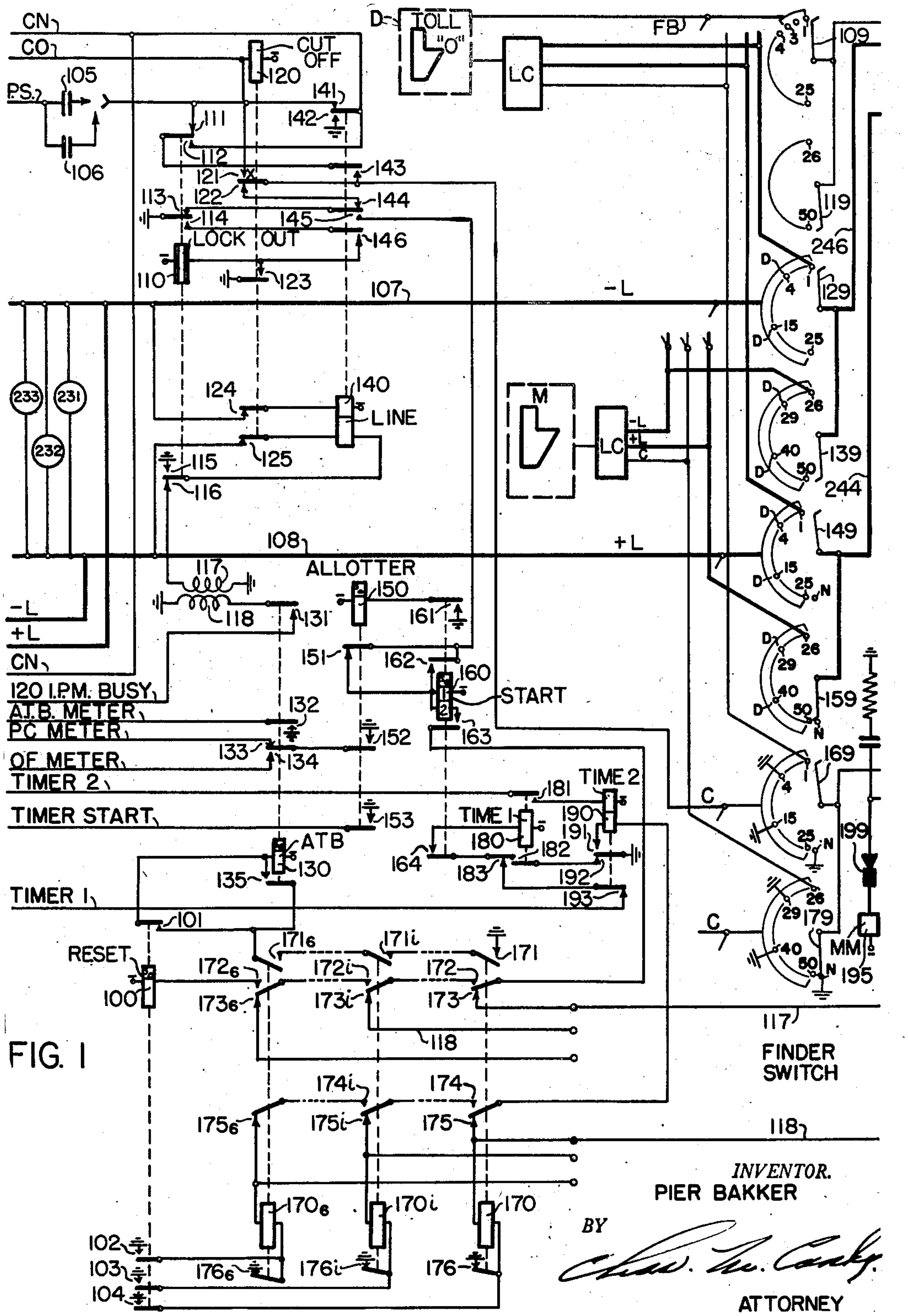
Fig. 1 shows the line equipment for one subscriber's line with a plurality of parties thereon and the relation which such line equipment has to an eight-bank twenty five-point rotary line finder. The lower portion of Fig. 1 also shows an all-relay allotter for assigning the calls made to an idle finder-connector link of the system.
Figure 2:
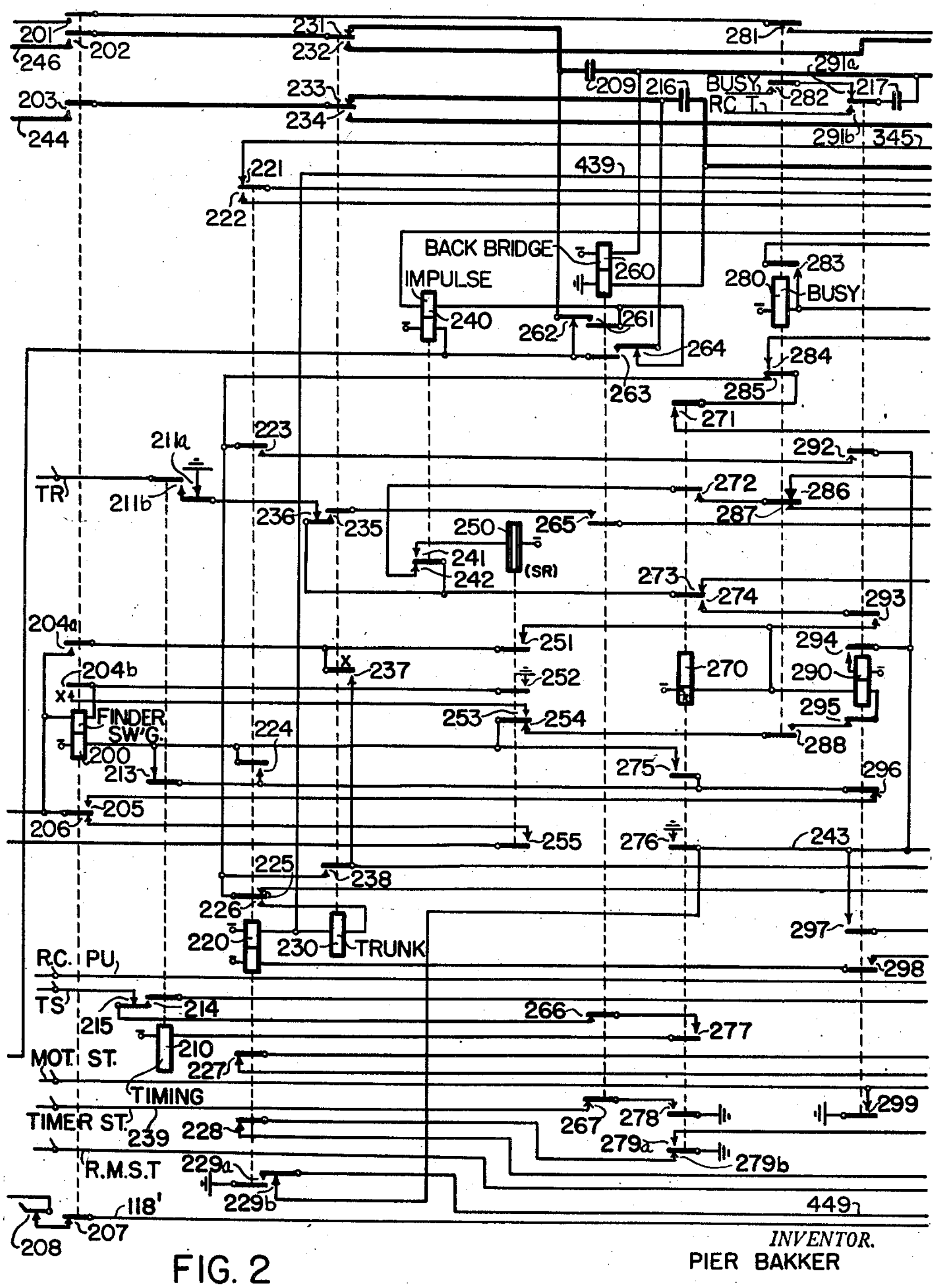
Figs. 2, 3 and 4 show the equipment making up part of one finder-connector link in conjunction with the line finder shown in Fig. 1.

The drawings, numbering four sheets and comprising Figs. 1 to 7 inclusive should be arranged with Fig. 1 to the left and Figs. 2, 3 and 4 in numerical order each to the right of the next lower in number, and when so arranged with corresponding lines of the various adjacent figures in alignment, will diagrammatically disclose sufficient circuits and apparatus to enable the invention to be understood in conjunction with the detailed description which follows.

Referring now to Fig. 1, in brief, all subscribers, such as subscriber #231, are equipped with a standard and well known monophone handset with dial. Each subscriber has a local line circuit, the conductors of which terminate in a finder bank. Each subscriber line has a line relay which operates responsive to removal of the handset from the cradle. The mechanism of the finders is of the well known rotary type, the wipers of which move around in a forward direction only and remain in the position last used. In the instant invention, the particular finders depicted herein search for absence of ground, which condition also will occur responsive to raising the handset.

The operation and circuit details of the rotary connectors are somewhat different from finders in that the wipers of the connector are directively operated to a called line and are automatically restored to normal upon termination of the conversation.

In the case illustrated applicant has elected to show a system having a maximum of forty local lines having numbers, 21X to 20X in the first tens group, 31X to 30X in the second tens group, 41X to 40X in the third tens group, and 51X to 50X in the fourth tens group, inclusive, with provision for as many as ten parties per line, or a maximum of four hundred subscriber stations in all. The system has six allotter relays sequentially operated, of which there are three shown in Fig. 1, to allot predetermined ones of the six finder connector links available in the system. The connector switches are shown in Fig. 4.

The system also provides six two-way trunks for calls out of and into the local area served by this system. These trunks may be wired for overflow or one common trunk as an overflow for two trunk groups.

Certain relays in this system are two-step relays, such as 200, 230, 290, 310, 330, 360, 370, 380 and 420, and operate their contacts marked "X" in their first step and their remaining contacts in their second step. Relays 100, 130, 150, 160, 310 are slow-to-operate, and are also appreciably slow-to-release. Relays 110, 250, 310, 340 and 410 are equipped with copper sleeves around their cores rendering them slow-to-release but not slow-to-operate with the exception of relay 310 which because of its slug as well as its sleeve is both slow-to-operate and slow-to-release.

A minor switch of the well known type having an operating magnet and a release magnet is contained in each finder-connector link as well as a number of marking relays, 360, 370, 380, 390, 400 and 420, which are responsive to different digits dialed into said minor switch. These relays in turn mark predetermined points on the connector switch banks so that the connector switch may step thereto and await thereon the next digit which is dialed directly to the stepping magnet of the connector. After the connector has thus functioned, a third digit determining the ringing code of a party on a party line is channelled to the minor switch.

The minor switch and marking relays operate similarly responsive to certain initial digits to mark a trunk or trunk group on the connector bank contacts assigned thereto.

Provision is also made by including "X" and "Y" leads for optional wiring if two-digit trunks are needed. By use of these leads properly wired, two-digit trunks are available. However, as will be described in detail hereinafter, they are wired to line bank contacts in the fourth tens group and correspondingly cut down the number of subscriber lines available in that group of the system.

Having briefly described the apparatus involved in a system of this type, a detailed description of the operation will now follow.

*Local connection*

For this purpose, it will be assumed that subscriber 231 wishes to call subscriber 475. When subscriber 231 raises his handset to initiate the call, a circuit is completed through the loop from ground through induction coil 117, contact 116, lower winding of line relay 140, contact 125, conductor 108, the conventional handset of calling subscriber 231, conductor 107, contact 124 and upper winding of line relay 140 to battery, energizing relay 140. Relay 140 operating; places ground upon the CN lead through contact 142, making this line busy to any incoming calls thereto on the connector banks; removes ground from the C lead by opening contact 144 and in so doing marks the calling line on its associated finder switch bank, in this instance contact 7 on the finder bank served by wiper 169; prepares a locking circuit for the lockout relay 110 from ground, open contact 114, contact 146, through relay 110 to battery; connects the cut-off relay to the C lead from which ground was just removed through contact 111 and contact 143; and completes a circuit from ground through contact 113, contact 145, contact 151, upper winding of allotter start relay 160 to battery, operating allotter start relay 160.

The function of the allotter is to preselect and assign an idle finder-connector link for a succeeding call whenever a call is initiated, and to distribute traffic to the finder-connector links in regular rotation. The allotter consists of twelve relays, nine of which are shown in Fig. 1. Each time a call is initiated, start relay 160 operates, as traced hereinbefore. In operating, relay 160 closes a circuit from ground through contact 161, relay 150 to battery, operating relay 150. Slow-to-operate relay 150 in operating closes a circuit from ground through contacts 152, 133, peg count (PC) meter, not shown, to battery, which meter counts the total number of calls for all links. Relay 150 in operating also closes a circuit from ground through contact 153, through a timer start relay, not shown, to battery. The allotter start relay 160 having operated, seizes the preselected idle finder-connector link, the circuit for which is from ground through contacts 113, 145, 162, lower winding of relay 160, contacts 163, 173, over conductor 117 and through lower winding of impulse relay 240 in Fig. 2 to battery thereon; closes contact 164 extending timer #1 lead through contacts 193, 183, 164, through timer #1 relay 180, to battery thereon. Ground pulses three seconds apart are forthcoming on the timer 1 and 2 leads. If the calling line is not found before the first ground pulse arrives over timer 1, lead relay 180 will operate, holding itself operated from ground through contacts 192, 182, 164, through its winding to battery, closing timer 2 lead through contact 181, relay 190 to battery. The next ground pulse over timer 2 lead will operate relay 190 through this circuit closing contact 191, opening the holding circuit to relay 180 at contact 192, and shunting relay 170 from ground through contact 191, relay 190 lower winding, contact 175, relay 170, contact 176 to ground. Relay 170 falls back and the operating ground from the start relay 160 will seize the next idle finder-connector link by a circuit from ground through contacts 113, 145, 162, relay 160, contacts 163, 172, $173_1$, over conductor 118, and impulse relay, such as 240 in a second link, to battery. In this manner the seized link has a maximum of six seconds to find the calling line. If unsuccessful after six seconds, the allotter will sequentially allot the next idle link to the task. This cycle may be repeated until the calling line is found. Subsequent calls will similarly be allotted sequentially until all six sequential relays have been used and have fallen back either due to timing or to an open circuit at contact 207, at which time the operating ground of relay 160 will be extended through contacts 172, intermediate contacts $172_1$, contacts $172_6$, through reset relay 100 to battery. Reset relay 100 will then close ground through contacts 102, 103 and 104 and other similar contacts, through the windings of relays $170_6$, $170_1$, and 170 and other similar relays, the respective conductors 118, busy keys 208, contacts 207, conductors 118′, normal bank contacts and wipers 448, interrupter contacts 434 and connector motor magnets 433 (Fig. 4) to battery, operating all sequential relays whose links are not busy. Due to the high resistance of the sequential relays, such as 170, the motor magnets are not operated over these circuits. If all the links are busy, operation of reset relay will close a circuit to the "All trunks busy" (ATB) relay from ground through contacts 171, $171_1$, $171_6$, 101 through ATB relay 130 to battery. Slow-to-operate relay 130 operating will lock itself through its own contact 135 and will close a circuit from ground through contact 132 through ATB meter, not shown, to battery, registering an all trunks busy condition. If all are busy and another call is attempted, relay 150 will operate closing a circuit from ground through contact 152 and contact 134, the latter having been closed by operation of ATB relay 130 as previously set forth, through an overflow meter, not shown, to battery, registering thereon the condition that additional calls were attempted when all links were busy.

When all links are not busy, operation of reset relay 100 will not operate slow-to-operate ATB relay 130 because its operating circuit is opened at any of the reset contacts 171, $171_1$, or $171_6$, before the relay 130 has had sufficient time to operate.

Returning now to the call from subscriber 231 to subscriber 475, it will be assumed that by means of the allotter hereinbefore described, impulse relay 240 in Fig. 2 has been seized through the contacts 173 of the first idle allotter relay.

Relay 240 operates through its lower winding and closes a circuit to relay 250 from ground through contacts 211*a*, 236, 241, relay 250 to battery. Relay 250 operates and completes a circuit at contact 255 from ground on the normal contact, N, of the bank of the finder switch served by wiper 179 through contacts 206, 255, 199, motor magnet 195 to battery. This operates the finder motor magnet 195 which upon releasing by the opening of its own circuit at its interrupter contacts 199, steps the wipers 109, 129, 149 and 169 to the first bank contact. As was previously mentioned, relay 140 had removed ground from the C lead of the calling line, whereas all other lines have their C leads grounded. The motor magnet, 195, therefore, will continue to operate and release, self interrupted over the circuit described immediately above from ground encountered on the finder bank contacts of non-calling lines. This sequence will continue until the bank contact of the calling line is reached, which being ungrounded will not permit the motor magnet 195 to step further.

Relay 250 also has prepared a circuit from ground through contacts 252, upper winding of finder switching relay 200, contacts 206, 255, 199, motor magnet 195 to battery. This winding of relay 200, however, is short circuited during the stepping of motor magnet 195 by the ground encountered on wiper 169 from the grounded bank contacts of non-calling lines. When the finder wiper 169 reaches the calling line, absence of ground thereon allows finder switching relay 200 to operate through its upper winding in series with motor magnet 195 through the circuit described immediately above. Motor magnet 195 will not operate over this circuit as the current therein is not great enough to permit it to do so because of the high resistance of relay 200. Relay 200 operates closing its "X" contact, 204*b*, and locks through its lower winding in a circuit from ground through contacts 252, 204*b*, 253, lower winding of relay 200 to battery. Finder switching relay 200 now fully operates and opens the circuit to motor magnet 195 by opening contact 206; closes a circuit to the calling line cut-off relay 120 from ground on contacts 252, 204*b*, 253, 213, 296, 205, wiper 169, over C lead of calling line, contacts 143, 111, cut-off relay 120 to battery; closes a circuit to relay 270 from ground at contacts 252, 204*b*, 253, 213, 296, 205, 204*a*, 251, relay 270 to battery; closes the negative and positive talking conductors, —L and +L, of the calling line through the finder to the connector link at contacts 202 and 203; and opens the circuit to the link's associated allotter relay 170 by opening its holding circuit at contact 207, releasing said allotter relay which then selects the next idle link for the next call as described hereinbefore.

Cut-off relay 120 operates, closing its "X" contact 121 first and locks therethrough over the same circuit from which it was operated except that it now bypasses contact 111 and 143; opens the operating circuit of line relay 140 at contacts 124 and 125; and closes a circuit to lockout relay 110 from ground through contact 123. Line relay 140 releases and opens contact 145 which breaks the circuit to the allotter start relay 150; and connects the C lead to the connector normal, CN, lead through contacts 141 and 121 to maintain this line busy to the connectors. Lockout relay 110 operates for purposes which will be fully described hereinafter.

When relay 270 operates as previously described it closes a circuit to upper winding of relay 300 from ground on contacts 276, over conductor 243, contacts 357, 372, 362, relay 300 to battery; closes a circuit to the lower winding of relay 410 from ground on contacts 276, over conductor 243, contact 357, relay 410 to battery; closes contact 277 to connect the permanent timing start (TS) lead to timing relay 210 through contacts 215, 266, 277, relay 210 to battery to start "permanent timing," which will be explained also in detail hereinafter; and closes contact 278 to put ground from contacts 278 and 267 on the "time start" lead, 239. Relay 300 operates; closes contact 303*b* connecting dial tone through contacts 315*b*, 303*b*, upper winding of relay 240, contacts 264, 233 and 203 onto the line conductor 244, and out over the loop in well known manner; and closes a locking circuit to relay 410 from ground, contacts 413, conductor 345′, contact 302, conductor 345, contact 221, upper winding of relay 410 to battery. Relay 410 in operating connects the wipers 447 and 448 of connector CS together by closing contact 417. Functions of other contacts of operated relays will be described hereinafter in the sequence in which their functions appear.

All of the operations hereinbefore described have taken place responsive to subscriber #231 having removed the handset from the cradle.

Having relays 110, 120, 240, 250, 200, 270, 300 and 410 now operated, the subscriber hearing dial tone begins to dial. All local numbers begin with digits 2, 3, 4 or 5, each designating groups of ten lines, the 2 and 3 groups comprising twenty lines are represented on the twenty five point connector bank levels as contacts 5 to 14 and 16 to 25, contacts 1, 2 and 3 being reserved for trunks and 4 and 15 being dead contacts. The second digit represents the ten different lines in the initial digit tens group while the third digit represents a ringing code for each of the possible ten party subscribers per line.

Dialing is accomplished by means of a well known finger dial which sends out a series of impulses on the return motion of the dial equal to the number selected. Since it was assumed that subscriber 231 is calling subscriber 475 the first digit dialled is 4. This will alternately open and close the loop circuit at the dial springs four times and relay 240, the impulse relay, will follow the loop impulses alternately restoring and operating. The loop circuit for relay 240 may be traced from dial tone ground on contact 351b, through contact 303b, upper winding of impulse relay 240, contact 264, 233, 203, conductor 244, finder wiper 149, conductor 108, subscriber circuit 231 and back over conductor 107, finder wiper 129, conductor 246, contacts 202, 231, 262, lower winding of impulse relay 240 to battery. Relay 250 will not fall back during the impulsing because of its copper sleeve making it slow-to-release. As relay 240 falls back with each pulse it closes a pulsing circuit at contact 242 to the minor switch motor magnet 408. This circuit is traced from ground, contacts 211a, 236, 242, 272, 287, 334, relay 340 to battery and through the same contacts plus contact 325, motor magnet 408 to battery, operating both relay 340 and minor switch motor magnet 408 in parallel. Relay 340 having a sleeve, is slow-to-release, and will stay operated during the pulsing into the minor switch. The minor switch will step once per pulse and as the digit 4 was dialled, the minor switch will step its wipers four times to contact 4 to operate predetermined marking relays.

After the final pulse of the digit, relay 340 restores placing ground on the last and next terminal of minor switch top bank served by wiper 419 which are multipled respectively with all even and odd contacts on said bank. This ground is from contacts 276, conductor 243, contacts 344 to the last contact or over the same circuit and through additional contact 359 to the next to last contact. This ground as traced to the last contact will be extended through the even contact multiples to contact #4 and thence over wiper 419, fourth bank contact, conductor 435, contact 354a, back on conductor 436, contact 425a, upper winding of wiper switching and marking relay 420 to battery. Relay 420 operates closing its "X" contact 427B first and locks therethrough to ground on spring of contact 276 over conductor 449 and contact 229b. Wiper switching relay 420, now fully operated switches its operating ground from contact #4, over conductor 435, contact 354a, conductor 436, contact 425b, lower winding of marking relay 370 to battery; switches from one wiper set to the other wiper set by closing contacts 421b, 423, and 424b.

Marking relay 370, responsive to digit #4, operates; locks to ground by closing its "X" contact 373 to ground on conductor 243; closes a circuit to relay 350 from ground, through contact 378a, minor switch off-normal contact (MSON) 431, closed when the minor switch stepped from normal, through relay 350 to battery; marks connector bank contacts 1, 2, 3 and N, served by wiper 447 with ground over leads 1, 2, 3, and BN by closing respectively contacts 376, 375a, 374 and 378a; and connects ground through contacts 379, 319 to the R. M. ST. lead to start the ringing machine.

Relay 350 operates and closes a circuit to the minor switch release magnet 409 from ground on lead 243, contacts 358, 335b, 309, 389, 396, 407, minor switch off-normal contact 432, release magnet 409 to battery; and also closes contact 351a and opens 351b thereby replacing dial tone and ground to the upper winding of relay 240 with direct ground thereby removing dial tone from the calling subscriber's line. Release magnet 409 of the minor switch operates restoring the minor switch wipers to normal and mechanically opens its off-normal springs 431 and 432, thereby breaking its own circuit at the off-normal springs 432. Opening of off-normal springs 431 opens the holding circuit for relay 300, previously described. The circuit to relay 350 is also broken upon opening of off-normal springs 431. Relay 300 restores, closing contact 303a placing ground through the upper winding of pulsing relay 240 to hold the loop intact when relay 350 restores; and opens the circuit to the upper winding of relay 410 by opening contact 302. Relay 350 restores and closes a circuit to the lower winding of relay 410 from ground on conductor 243 through contacts 357, relay 410 to battery. Relay 410 remains operated between the opening of its upper winding circuit and closing of the circuit just described to its lower winding because of its slow-to-release sleeve effect.

Returning to where relay 370 operated and marked ground on contacts 1, 2, 3, and N of the connector bank served by wiper 447, the ground on contact N closes a circuit through wiper 447, contact 417, interrupter contact 434, connector motor magnet 433 to battery. Motor magnet 433 operates, opens its own operating circuit at its interrupter springs 434, stepping wiper 447 to the first bank contact served by wiper 447. This bank contact is grounded also by the marking relay 370 and wiper 447 extends this ground over the same circuit as above thereby reoperating motor magnet 433 and stepping connector wipers to contact #2. The motor magnet 433 of the connector continues to operate in this manner, self interrupted, until the wipers of the connector switch reach the respective fourth bank contacts, no busying ground being encountered on the fourth contact of the bank served by wiper 447 because of the high resistance of the lower winding of transfer relay 320. As relay 420 has switched wiper sets and as the selected wipers are now standing on the fourth bank contacts thereof, a call to a subscriber in the third tens group, or more exactly, the first tens group of banks served by wipers 422, 444 and 446, is indicated. A circuit is now completed from ground through contacts 276, conductors 243, lower winding of relay 320, contacts 365, conductor 4, fourth contact of connector bank served by wiper 447, contact 417, interrupter contact 434, motor magnet 433 to battery. Transfer relay 320 operates closing contact 326, transferring the pulsing circuit of relay 240 at this point from the minor switch motor magnet 408 to connector motor magnet 433 by continuing from contact 334 through contact 326, over conductor 346, connector motor magnet 433 to battery. Although transfer relay 320 operates at this time, motor magnet 433 in series with the lower winding thereof will not operate due to the high resistance of said lower winding of relay 320.

The second digit is now dialled and at this time it will be remembered that relays 120, 110, 240, 250, 270, 320, 370 and 420 are operated. The connector wipers are resting on the respective fourth bank contacts. The second digit is the units digit of the subscriber line number. Since it is assumed that the call is to subscriber 475, seven is now selected on the dial. As the dial returns, the loop is opened seven times which will cause impulse relay 240 to fall back seven times. Each time relay 240 restores it closes the connector pulsing circuit from ground on contacts 211a, 236, 242, 272, 287, 334, 326, conductor 346, connector motor magnet 433 to battery, and over the same circuit through contact 334, relay 340 to battery. Relay 340 operates on the first pulse and being sleeved remains operated during the entire digit pulsing. Relay 340 closes contact 342 closing a holding circuit to transfer relay 320 from ground through contact 342, 327, upper winding of relay 320 to battery. This assures continued holding of the pulsing circuit to the connector motor magnet 433 when the wipers thereof step off bank contacts #4 whereupon lower winding of relay 320 loses its operative battery through the motor magnet 433. Connector motor magnet 433 follows the pulses of relay 240 stepping the wipers seven times to contacts #11, the called line. After the last pulse, relay 240 remains operated over the loop circuit but relay 340 in multiple with motor magnet 433 restores. Release of relay 340 opens the holding circuit to transfer relay 320 at contact 342, restoring relay 320. In restoring, relay 320 closes contact 325 retransferring the pulsing circuit hereinbefore described again to the minor switch motor magnet 408. The connector switch has its wipers, in this particular call wipers 442, 444 and 446, on the —N, +N and CN leads respectively of the called party's line.

The marking arrangement described in conjunction with dialing the first digit "4" of this local call operates similarly for other first digits. For example, digit three would move the minor switch to the third bank contact and ground would be extended therefrom to operate associated marking relays 370 and 360. These relays in operating would mark ground on contacts 1, 2, 3, 4, 5, and 6—14 of connector banks of wiper 447, but wiper switching relay 420 does not operate, leaving the calling loop lines closed to connector wipers 441, 443 and 445. Connector motor magnet 433 steps the wipers self interrupted as explained hereinbefore until the fifteenth contact with no busying ground thereon is reached a circuit for the transfer relay 320 is thereby completed to permit operation of the connector wipers on a subsequent dialled digit. This indicates a call has been marked for the second tens group of the first group of twenty lines. The second digit when dialled will now step the connector wipers to the corresponding contact in the marked tens group. If the line called was 36, then the connector will move its wipers responsive to the second digit dialled to contact #21.

Having described the marking operations in response to dialing the first digits "4" and "3" it might be advisable at this point to describe briefly the similar marking operations which take place when the first digits "2" and "5" are dialled. For example, digit "2" would step the minor switch to its second bank contact and ground would be extended therefrom to operate marking relay 370. This relay then marks the first, second and third connector switch bank contacts to cause the connector motor magnet to step automatically into engagement with the fourth connector bank contact. The wipers of the connector are now positioned to extend the call to one of the subscriber lines in the first tens group when the second digit is dialled. The second digit dialled then operates the connector wipers to connect with the called line. Since wiper switching relay 420 is not operated in response to dialing the first digit "2" the wiper set comprising wipers 441, 443 and 445 is used. If the line called was line twenty six then the connector wipers would stop in engagement with the tenth set of bank contacts.

In case the digit "5" is dialled for the first digit the minor switch would step to its fifth contact and ground would then operate relays 360 and 370 and wiper switching relay 420 to switch wipers. The operation of relays 360 and 370 grounds the first to fourteenth connector bank contacts accessible to wiper 447 to cause automatic operation of the connector wiper to the fifteenth bank contacts where the circuit is completed for transfer relay 320. In response to the second digit the connector wipers are advanced to the called line in the fourth tens groups. With wiper switching relay 420 operated the other set of wipers comprising wipers 442, 444 and 446 is used to extend the call. If the line called is line fifty six the wipers engage bank contacts 21.

In response to dialing the trunk digit "8" marking relay 380 and wiper switching relay 420 are operated in response to the positioning of minor switch in position 8. In response to the operation of relay 380 the connector wipers are advanced to the second or third bank contact, dependent upon the number of the "9" trunks and their location as will be explained more fully hereinafter, and to the first "8" trunk from where the wipers may be advanced if there is a second "8" trunk and the first "8" trunk is busy.

In response to dialing the trunk digit "9" marking relay 400 and wiper switching relay 420 are operated in response to stepping the minor switch to position 9. The operation of relay 400 causes the connector wipers to advance to their first bank contacts into engagement with the first "9" trunk line. If this trunk is busy the connector wipers automatically advance to the second 9 trunk line. If, however, there is only one "9" trunk then the wipers stop on this trunk regardless of its idle or busy condition.

The desired line having been selected, the subscriber now dials 5, the third and last digit for selection of the particular ringing code to be applied to the called line. Here again impulse relay 240 follows the dial pulses as the loop is alternately opened and closed and each time it falls back closes contact 242 to send a ground pulse over the circuit described in dialing the first digit to the minor switch motor maget 408. Again relay 340 operates on the first pulse in multiple with the stepping means and because of its sleeve will remain operated during pulsing the entire digit. This circuit has also been described hereinbefore. The motor magnet 408 follows the impulses from relay 240 over the pulsing circuit previously traced and steps its wipers to the fifth contact. The reoperation of the minor switch closes its off-normal contacts 431 and 432 and in so doing a circuit to relay 350 is closed from ground on contact 378a, over conductor BN, minor switch off-normal contact 431, relay 350 to battery. Relay 340 releases after the last pulse when its operating circuit is opened at contact 242. In restoring, contact 344 replaces ground from lead 243 onto the top bank of the minor switch served by wiper 419 over leads 245 and 247. Relay 350 operates and opens contact 359 removing the ground on the odd contacts of the minor switch top bank leaving the ground immediately hereinbefore described upon the even banks thereof. As relay 340 releases and 350 operates the circuit to relay 410 is opened at contacts 343 and 357. However, because of its sleeve, relay 410 is slow-to-release and while it is still up, relay 280 is connected to the CN lead of the called line on connector level served by wiper 446 over a path from contact 11 through wiper 446, lead CN2, contacts 424b, 415, 352, 341, 306, relay 280 to battery. During this time, before relay 410 falls back, the busy test is made. If the called line is busy, it has ground on its CN lead which will appear on the associated bank contact of the connector. Assuming for the moment that the line is busy, this ground will then be extended over the path just described, operating busy relay 280. Relay 280 then locks when relay 410 releases from ground, contacts 333a, 271, 284, 414, 352, 341, 306, relay 280 battery; at contacts 287, relay 280, opens the circuit to relay 340 and minor switch rotary magnet 408 so that any subsequent dialing will not step the minor switch; tests for a reverting call which will be described hereinafter; returns busy tone to the calling party by closing contact 282; and connects interrupted busy flash to the flash busy lead from the interrupter source at terminal 438, through contacts 411, 281, 201, finder wiper 109 to flash busy lead FB only in case the calling line is the toll operator at the toll board "D." Receiving busy tone, the calling party should release the connection by replacing the handset into the cradle.

Assuming now that the line called is idle, the CN lead thereof will have battery thereon from its cut-off relay and as sufficient time has elapsed during the busy test, relay 410 has released without operating busy relay 280 and a circuit is closed from ground, contacts 333a, 271, 285, 225, upper winding of ring through relay 330, conductor 256, contacts 416, 424b, lead CN2, connector wiper 446, bank contact 11, CN lead of called line, through contacts in the called line circuit, such as contact 141 and cut-off relay of called line to battery. Relay 330 operates and locks over a circuit from ground on conductor 243, contacts 337 through lower winding of relay 330 to battery; closes contact 331a preparing a path for the coded ring to go out over the called line loop; closes a path from the pick up lead, PU1, through contact 304, 332, 314, upper winding of relay 300 to battery; extends ground through connector wiper 446 to operate the cut-off and lockout relays, such as relays 120 and 110, of the called line, which circuit is from ground, contacts 333b, conductor 256, contacts 416, 424b, lead CN2, connector wiper 446, CN lead of called line to the called line cut-off relay, such as 120 to battery. As the cut-off relay of the called line operates, it closes a circuit to the lockout relay as described hereinbefore. Relay 330 further opens the dialing circuits to relay 340 and motor magnets 408 and 433 by opening contact 334 so that any further digits dialled will not move these switches. If an even digit was dialled (instead of an odd digit), relay 330 at contacts 335a closes a circuit from the ground on conductor 243, contact 344, conductor 245 to the even contacts of top minor switch bank served by wiper 419 through an associated contact 354a of operated relay 350, contact 335a, top winding of relay 320 to battery. As this ground is absent on the odd contacts due to operation of contacts 359, relay 320 will remain normal for odd code digits and operate for even code digits. A ground pulse on the pick up, PU1, lead at the start then completes a circuit to relay 300 from this ground pulse through contacts 304, 332, 314, upper winding of relay 300 to battery. Relay 300 operates and locks to ground at the holding ground lead, HG, which comes from the ringing interrupter and is grounded thereby during each code ringing cycle. This locking circuit is from ground on HG lead through contacts 305, 332, 314, upper winding of relay 300 to battery. Relay 300 in operating closes the circuit for the ringing code through relay 310 and out to the line. The circuit is as follows, from ground on springs of relay 320 through contact 323, 312, 331b, 423, over +N2 lead, wiper 444, +N lead through the called line circuit and called subscribers ringer, back over —N lead, contact 11, wiper 442, —N2, contacts 421b, 331a, 311a, 321, upper winding of slow-to-operate relay 310, contact 308a, conductor 258, wiper 418 of minor switch bank, contact #5 thereof to code #5 battery connected ringing interrupter lead R5. Ringing current then flows from this source out over the called subscribers line and through all the ringers on said line. If an even ringing code digit had been dialled, relay 320 would have operated to reverse the ringing and ringing current would be applied to the positive side of the line while the negative side is grounded. In either case the ringing current is connected to the line through the upper winding of relay 310.

When ringing current is extended to the line through upper winding of relay 310 as immediately hereinbefore described, a circuit for ringback tone is established from ringback tone condenser 369, over contacts 412 and 301 to the upper talking conductor. Ringback tone condenser 369 is of the order of .005 microfarad and passes only a small portion of the ringing current for this tone. This tone indicates to the calling party that the called line is being signaled. All ringers on the called line that are connected to the side of the line being signaled will ring, but only the party whose ringing code has been selected answers.

At the end of the first code ringing cycle, ground is momentarily removed from the HG lead. This opens the circuit to relay 300 which restores. Should the called subscriber answer during the interim period, relay 310 will operate over the called loop. If the subscriber being called does not answer the first series of rings, the next ground pulse over PU1 lead operates relay 300 again, which again locks to ground on the HG lead and the ringing code is sent again. The cycle is repeated until the called subscriber answers, or the call is abandoned or timed out, the latter to be described later.

Assuming now that subscriber 475 answers, in lifting his handset, a D. C. circuit is closed through the upper winding of relay 310 from ground on springs of relay 320 through contacts 323, 312, 331b, 423, connector wiper 444, called subscribers handset 475, back through connector wiper 442, contacts 421b, 331a, 311a, 321, top winding of relay 310, contact 308a, conductor 258, wiper 418 of minor switch to battery on the battery connected A. C. ringing generator lead R5. Relay 310 operates and locks from ground on conductor 243, contact 316, lower winding of relay 310 to battery. In operating, relay 310 opens contact 311a removing ringing current from the line; opens the circuit to relay 300 at contact 314 and extends the called line loop through to the windings of relay 260 by closing contacts 311b and 313. Relay 260 now furnishes talking battery to the called line. Relay 310, the ringing cut-off relay, at contacts 319 also opens the ringing machine start ground to stop the ringing machine. Battery feed relay 260 operates and in closing 261 and 263 and opening contacts 262 and 264 reverses battery from relay 240 to the calling line. This battery reversal is for collecting coins if the calling line is a paystation, metering, or to provide supervision if necessary. Relay 260 also opens the ground on the timer start lead at contact 267 and disconnects the TS lead at contact 266 from relay 210 so that permanent timing to be described hereinafter will not release the connection. The connection is now completed and the parties may carry on their conversation. Transmission battery is supplied to the calling line from battery on pulsing relay 240 and to the called line from back bridge relay 260.

When the conversation has terminated, either party may sever the connection by hanging up.

If the calling party releases first, the loop circuit will be opened to impulse relay 240. Relay 240 restores and opens the circuit to relay 250 at contact 241. Relay 250 restores and opens the circuit to 270 at contact 251; opens circuit to relay 200 at contact 252; and opens the locking ground to the calling party's cut-off relay 120 at contact 252. Relay 270 restores and closes a circuit to the minor switch release magnet 409 from ground on spring of relay 210 through contacts 211*a*, 236, 273, 389, 396, 407, minor switch off-normal contact 432, release magnet 409 to battery; opens the TS lead to relay 210 at contact 277, and removes the holding ground from relays 310, 330, 370 and 420 by opening contact 276. Cut-off relay 120 of the calling line releases which opens the circuit to lockout relay 110 at contact 123 and reconnects the line relay 140 to the line by restoring contacts 124 and 125 to normal. Lockout relay 110 restores. Minor switch release magnet 409 operates and restores the minor switch wipers to normal. Relays 310, 330, 370 and 420 release. Release of relay 330 places ground on all bank contacts except the twenty-sixth or normal contact, N, of the connector bank served by wiper 448 by closing contact 339, and opens the cut-off relay of the called line's line circuit by removing the holding ground at contact 333*b*, which opens and releases the called line's lockout relay. The release of the cut-off relay also reconnects the called party's line to its line relay which operates before the lockout relay releases because of its sleeve. This relocks the lockout relay through line relay contacts, such as contact 146 on the line relay, so that another call cannot be originated or received by the called party until its line relay restores and releases its lockout relay. When the minor switch restores, the circuit to relay 350 is opened at off-normal contacts 431 and relay 350 restores. The ground on the connector bank of wiper 448 is extended over wiper 448, through interrupter contact 434, motor magnet 433 to battery. Connector motor magnet 433 operates, breaks its own circuit at its interrupter springs 434 and moves wiper 448 to the next bank contact, repeating this sequence of operation until the twenty-sixth or normal contact, N, is reached. Here the connector stops because there is no ground on the normal contact of the level of wiper 448 with which to further operate the motor magnet. Battery from the connector motor magnet 433 is now connected through wiper 448, contact N, conductor 118, contact 207, busy key 208 to its associated allotter relay 170, in the allotter group. The presence of this battery indicates to the allotter that this link is idle and ready for another call. The finder switch has no "home" position and remains opposite the former calling line until a new call is assigned to it.

If the called party releases first, its loop circuit will be opened to back bridge relay 260 which restores. In restoring, relay 260 reverses battery again to the calling party by closing contacts 262 and 264, and connects the TS lead through closed contact 266 to relay 210 to start "permanent" timing and to start the timer, to be explained fully hereinafter.

Release from a busy condition is essentially the same as for a regular calling party release except that at this point there are not as many relays operated, and relay 280, the "busy" relay, is operated. When the calling party hears busy tone, he opens his loop circuit by replacing his handset into the cradle. Opening of the loop thereby opens the circuit to impulse relay 240 which restores. Relay 240 in restoring opens contact 241 which opens the circuit to relay 250. Relay 250 restores and opens the circuits to the calling lines cut-off relay 120, relay 200 and relay 270 by opening contacts 252 and 251. Relay 270 restores and closes a circuit to the minor switch release magnet 409 from ground on springs of relay 210 through contacts 211*a*, 236, 273, 389, 396, 407, off-normal contact 432, release magnet 409 to battery; disconnects the TS lead from relay 210 at open contact 277; removes locking ground from relays 370 and 420 by opening contact 276; opens the circuit to busy relay 280 at contact 271; and places ground on all bank contacts of the connector bank of wiper 448 except the twenty-sixth or normal contact, N, by closing contact 279*b*. Cut-off relay 120 restores and opens the circuit to lockout relay 110 at contact 123. The release magnet operates and restores the minor switch wipers to normal and in so doing opens the off-normal contacts 431 and 432. Opening of off-normal contact 431 opens circuit to relay 350 which restores. The ground on connector bank of wiper 448 steps the connector motor magnet 433 self interrupted as described hereinbefore until the twenty-sixth bank contact is reached. Battery from the motor magnet is then extended back to the allotter relay to indicate an idle switch available as explained hereinbefore. Again, the finder switch having no "home" position remains opposite the former calling line until a new call is assigned to it.

*Permanent timing*

As referred to hereinbefore, the "permanent" timing feature of this system releases the switch under four different conditions. There are:

*a*. If the calling station seizes a link and does not dial within two to four minutes. This timing also applies to delays in between digits in the dialing.

*b*. If the calling party does not hang up after receiving busy tone.

*c*. If the called station does not answer within two to four minutes after the ringing is started.

*d*. If the calling party neglects to hang up after the called party has released.

When the finder-connector link is seized, the following relays are operated; cut-off 120, lockout 110, impulse 240, relays 250, 270, 200, 410 and 300. The timing cycle starts when relay 270 places ground on the time start lead by closing contact 278 and closes the TS lead through contacts 215, 266, 277 and winding of relay 210 to battery. As previously described, the timer may also be started by the allotter relays or by another finder-connector link, which makes it possible to get a variable timing cycle. An interrupting mechanism is provided to place a ground pulse on the TS lead and remove ground from the TR lead every two minutes the ground on TS appearing immediately after its removal from TR. TS is the timer pickup lead and TR the release lead. Should the partially established connection complete the circuit to lead TS just after ground has been removed from lead TS, there will elapse a two minute interval before TS is again grounded and another two minutes before TR is grounded, totaling four minutes, which is maximum. Should the timing out connection be completed just as TS is grounded, the time from TS being grounded to TR losing its ground is only two minutes, the minimum. Thus, if the called party has seized the switch and has not attempted to dial, the TS lead will receive a ground pulse and operate timing relay 210 over the circuit hereinbefore described. Relay 210 operates and locks to ground from lead 243 through contacts 344, 214, 266, 277, through its winding to battery. In operating, relay 210 replaces the holding ground for relay 250 with the ground on the TR lead, the circuit for which is through contacts 211*b*, 236, 241, relay 250 to battery. When the ground from the TR lead is removed as previously described, relay 250 is opened. When relay 250 releases, it opens circuits to relays 200 and 270 at contacts 251 and 252. Relay 200 restores and disconnects the line from impulse relay 240 at contacts 202 and 203 as well as opening the previously described circuit to cut-off relay 120. As the calling party still has the loop circuit completed, his line relay 140 re-operates when relay 120 restores and locks relay 110 in manner already described in the local connection section. This places ground on the finder banks from ground on spring of relay 140 through contacts 142, 112, and 143 and onto the C lead and grounds the CN lead at contact 142 so that the line will appear busy on the connector switch banks. Relay 270 restores and opens the circuits to relays 390 and 410 at contact 276, restoring the link to normal. Release of relay 200 also extends battery through the connector motor magnet 433 to the allotter relays by closing contact 207. However, the calling line is not able to initiate or receive another call until the line is cleared by release of the line relay 140 and lockout relay 110, which is accomplished by returning the handset to the cradle.

The same timing out applies during ringing, except that all relays which are operated during ringing and the minor switch and the connector switch will be released. Reference may be had for this purpose to the description of ringing the called line in the local connection.

Again the same timing out applies when the calling subscriber does not hang up upon the conclusion of the conversation, the release being the same as described for a calling party release in the local connection section hereinbefore described except that the timing pulse releases relay 250 and the calling line is locked out.

Also the same timing out applies when the calling subscriber fails to hang up after receiving busy tone. Here again the release is described in calling party release in the local call except that relay 250 is released by the removal of ground from lead TR rather than the opening of impulse relay 240 and here also, the calling line will be locked out.

And finally, this timing out applies to unanswered reverting calls, which will be discussed immediately hereinafter.

*Reverting call by directory number*

Reverting calls by directory number will be made by stations on a party line in calling one another. To initiate a call of this character, a station dials the desired directory number and then hangs up. After the third digit has been dialled, the operation of which is the same as described up to that point in the local connection and to which reference here may be had, the following relays are operated: cut-off relay 120, lockout 110, relay 200, impulse 240, release 250, relays 270, 350, 410, 3360, 370 and possibly 420 depending upon the group called. Also operated are the finder-connector and minor switches. Since in a reverting call, both calling and called parties are on the same line, the cut-off and lockout relays will be common for both parties. When relay 350 operates, it closes a circuit to busy relay 280 from ground originating on the calling party's C lead encountered on the connector bank contact which has been made busy by the calling party himself, from ground at contacts 252, 204*b*, 253, 213, 296, 205, wiper 169, C lead, contacts 121, 141, CN lead to the connector bank through the wipers 445 or 446 as the case may be, contacts 424*a* or *b*, 415, 352, 341, 306, winding of busy relay 280 to battery, and also opens the circuit to relay 410 at contact 357. Busy relay 280 operates before slow-to-release relay 410 restores, and after relay 410 restores, relay 280 locks to ground from springs of relay 330 through contacts 333*a*, 271, 284, 414, 352, 341, 306, through relay 280 to battery. Busy relay 280 closes contact 282 putting busy tone out on the called line as described in the local call; opens the circuit to the minor switch magnet 408 at contact 287; and prepares a circuit for the lower winding of relay 290.

When the calling station receives busy tone, the handset is replaced onto the cradle. This opens the loop circuit to impulse relay 240 as described in a calling party release in the local call. Relay 240 restores and opens circuit to relay 250 at contact 241 and also projects ground from spring of relay 210 through contacts 211*a*, 236, 242, 272, 286, 416, 424 to the associated wiper on the connector. Since the relays in the line circuit of the called line are common with those of the calling line in a reverting call, this ground is projected over the CN lead, through contact 141, winding of cut-off relay 120 to battery. This ground is further extended through contacts 121, over the C lead, through finder wipers 169 or 179 as the group of the calling line will determine, contacts 205, 296, 275 to spring of contact 254 of relay 250. Relay 250 restores and opens the original holding grounds for relays 200 and 270 at contacts 251 and 252, and closes contact 254, completing ground on the spring thereof immediately hereinbefore traced through the lower winding of relay 290 and 270 to battery. Reverting call relay 290 operates in series with relay 270 and locks from ground through contacts 276 and 294 through upper winding of relay 290 to battery; and closes a holding ground for relay 270 from ground on contact 211*a* through contacts 236, 274, 293, relay 270 to battery; closes ground to the motor start lead at contact 299; closes ground from conductor 243 through contact 297 and lower winding of ring through relay 330 to battery; and opens circuit of relay 200 at contact 296.

Ring through relay 330 operates and locks to ground on lead 243 through contact 337 and if the last digit was an even number, closes a circuit to transfer relay 320 as described in the local call. Relay 330 also connects PU1 lead to battery through the upper winding of relay 300 by way of contacts 304, 332 and 314, for the ringing code pickup pulse, and opens locking ground for busy relay 280 at contact 333a. Relay 330 also grounds the connector wiper on the CN bank through contact 333b and over lead 256 and contacts 416 and 424 so that the cut-off relay of the line circuit will not release when busy relay 280 restores. Relay 280 restores. Ringing begins when the PU1 lead is grounded at the beginning of a complete ringing cycle as explained also in the local call. The ground from the PU1 lead operates relay 300 which locks from the holding ground, HG, lead from the ringing interrupter during the complete ringing cycle. Relay 300 closes ringing current through to the line through the upper winding of ring cut-off relay 310 in the same manner as occurred in the local call. As before, in the local call, if an even ringing code third digit is selected, relay 320 operates and ringing current goes out through contact 324 onto the plus side of the line whereas if an odd ringing digit is selected, relay 320 will remain normal and allow the ringing current to be applied to the negative side of the line through contact 321. The ringing code applied, as in the local call, is determined by the location of the minor switch wiper 418 which location in turn is determined by the third digit dialled. If the calling station's ringer is connected to the same side of the line as that of the called station, as it would be if the third digit of the calling and called lines were both odd, or both even, the calling station's ringer will ring with that of the called station, as will all the ringers of the other parties whose ringers are attached to the same side of the line being rung; on the other hand, if the calling station's ringer is not connected to the same side of the line as that of the called station, the calling station's ringer will not ring and as a consequence, the calling party in such an instance must allow a reasonable time for the called station to answer. Assuming the called station now answers and closes the loop for a direct current circuit completed through the upper winding of relay 310 from the battery connected interrupter; relay 310 now operates on this direct current circuit although it did not operate on the alternating ringing current before, due to its slow-to-operate characteristic. Relay 310 locks to ground on lead 243 through contact 316, lower winding of relay 310 to battery; opens the circuit to relay 300 at contact 314; removes ground from the ringing machine start (R. M. S. T.) lead at contact 319; connects the RCPU lead through contacts 317, 298, lower winding of relay 220 to battery; disconnects ringing current from the line by opening contacts 311a and 312; switches connector levels connected to the + and −N leads of the line through to back bridge relay 260 for battery feed; and connects reverting call (RC) tone to the called line by closing contact 311b through condenser 217 and contact 291b to indicate to the called party that a reverting call is being received so that the called party will not hang up at once upon failing to find the calling party on the line, but will wait for the calling party to come back onto the line. Relay 300 restores. Back bridge relay 260 operates over the loop circuit of the called station and in operating, disconnects TS lead from relay 210 at contact 266 to discontinue "permanent" timing, connects reverting call cut-off (RCCO) ground through contacts 315, 265 to spring of contact 235, and removes ground from time start at contact 267 to stop the timer. A ground pulse will enter the RCPU lead and close a circuit through contacts 317, 298, lower winding of relay 220 to battery. Relay 220 operates and closes a circuit from ground on spring of relay 270 through contacts 276, 292, 223, 226, relay 230 and upper winding of relay 220 to battery. Relay 230 operates in series with relay 220 and connects the RCCO ground through contacts 315, 265, 235, 274, 293, relay 270 to battery which will hold relay 270 in place of the ground from contact 211a on relay 210. Approximately three to four seconds after RCPU lead is grounded to operate relay 220, the ground is removed from the RCCO lead. With this ground removed, relay 270 restores and the holding circuits for relays 290, 310, 320 if operated, relays 330, 360, 370, 210 and 230 are removed by opening of contact 276. These relays all release. Ground from relay 290 is similarly removed. Relay 350 restores through open contact 367. When relay 230 releases a circuit is completed from ground on contact 211a of relay 210 through contacts 236, 273, 389, 396, 407, off-normal contact 432, release magnet 409 to battery, which magnet operates, restoring the minor switch to normal. With relays 270, 330 and 220 released, all bank contacts on the connector bank of wiper 448 are grounded except the twenty-sixth or normal contact, N, and the connector steps to this contact self interrupted as described in the local call until it reaches its N contact where it stops. Release of relay 330 removes ground from the CN lead to the cut-off relay 120 so that its ground circuit is open at contact 333b. Relay 120 restores, opens circuit of lockout relay 110 at contact 123 and reconnects line relay 140 to the loop through contacts 124 and 125. Relay 140 operates, holds lockout relay 110 operated through contact 146 and 114, grounds the finder bank at 142 through contacts 112 and 143 to the C lead so that the finder will not select this line, and grounds the CN lead also at contact 142 to mark it at the connector banks as busy to other calls. When the calling station comes back on the line, no further relays operate. Both parties are on the same line and use the same line circuit. Talking battery is supplied by the line relay 140 of the line circuit.

After the conversation has been completed, the last party to hang up opens the loop circuit to line relay 140. Relay 140 restores, opens the circuit to lockout relay 110, at open contact 146 and removes ground from the CN lead at contact 142 to mark the line idle on the connector banks. Lockout relay 110 restores and places ground on the finder bank contact associated with the line through contacts 113, 144, 122, and over the C lead thereto. The circuit is now normal.

If the calling station desires to disconnect the call before the called station answers, the calling party merely lifts the handset momentarily and then replaces it. The ringing will stop and all operated relays will function as described hereinbefore where the called party to the reverting call answered. Only the line and lockout relays remain operated and when the calling party hangs up, these restore as in the paragraph above where the last party released and returned the circuit to normal.

If a reverting call is made and not answered ringing continues for a predetermined length of time. The connection is automatically released by the "permanent timing feature described in the section on "permanent" timing hereinbefore with the exception that at that stage in a reverting call, relays 240, 250 and 200 are not operated and reverting call relay 290 which is operated, is released when relay 270 restores opening ground thereto at contact 276.

*Trunk calls*

There are six single-digit switch-through trunks available in this system. These trunks may be arranged into two three-trunk groups or into three trunk groups with a common trunk serving as an overflow trunk for two of the groups. These trunk groups may be reached by dialing "0," "9" or "8" as the trunk digit. This system is readily adaptable to the trunking needs of different localities. The ensuing variations are made possible by wiring as follows:

*a*. First group of single-digit, "0," trunks; if only one trunk in the group is desired, lead A and A1 (Fig. 3) are not wired. If two trunks are desired in this group, the A lead is wired to the CN connector bank contact of the first trunk in the group. If three trunks are to be used the A lead is wired to the CN connector bank 1 contact of the first trunk in the group and lead A1 is wired to the CN contact of the second trunk in the group.

*b*. Second group of single-digit "9" trunks, or part of second group of three accessed by digit "9"; if only one trunk is used, leads B and B1 (Fig. 4) are not wired. If two trunks are used, lead B is wired to the CN connector bank contact of the first trunk in this group. And if three trunks are used, the B lead is wired to the CN contact of the first trunk in this group and B1 lead is wired to the CN contact of the second trunk of the instant group. Where the first and third trunk of this group are used, the B lead is wired to the CN contact of the first trunk of the group and lead B1 is wired to ground.

*c*. Third trunk group, or part of the second trunk group accessed by dialing digit "8"; if only one trunk of the "9" group was used as the second trunk of the group, the C lead (Fig. 3) is not wired. If only one trunk of the "9" group was used and was the third trunk, the C lead is wired to ground. Where two trunks of the "9" group were used and were the second and third trunks of the group, the C lead is wired to the CN connector bank contact of the second trunk.

A trunking arrangement is shown in Figs. 5 and 6 wherein the second trunk group of three lines is composed of either two "9" trunks and one "8" trunk or one "9" trunk and two "8" trunks. In the first case as shown in Fig. 5 the second trunk in the group is a common overflow trunk for the "9" trunks in the group. Fig. 6 exemplifies a third contact "8" trunk as overflow for the two "9" trunks. Fig. 7 is an arrangement for the last "9" trunk to be common overflow for the other "9" and the "8" trunk.

Assume now that the wiring is such that three trunks are available to digit "0." These trunks appear on bank contacts #1, #2 and #3 of connector levels served by wipers 441, 443 and 445. When "0" is dialled as the first digit, seizure of an idle finder-connector link through operation of the allotter relays will again be the same as described in the local call. Relays 120, 110, 240, 250, 200, 270, 410 and 300 are operated, impulse relay 240 following the dial interruptions in the calling line loop circuit, closing circuits during restorations to relay 340 and minor switch motor-magnet 408 in multiple, stepping the minor switch wipers to the tenth bank contact in the same manner as described in the local call. Relay 340 releases after the final pulse of the digit due to open contact 242 in its operating circuit and extends ground to the top minor switch bank of wiper 419 from conductor 243 through closed contact 344 and over conductor 245 and conductor 247 through contact 359. Wiper 419 extends this ground to the tenth contact on its bank which is connected to "0" marking relay 390 and battery. Marking relay 390 operates over this circuit from ground on the tenth top bank contact of the minor switch through contacts 356*a*, relay 390 to battery. In operating relay 390 locks to ground on conductor 243 through its own contact 392; closes a circuit to relay 350 from ground through contact 395, over conductor BN, minor switch off-normal contact 431, relay 350 to battery; grounds the normal, N, bank contact of wiper 447 from ground through contact 395 and over conductor BN; closes a circuit from ground on contact 413 through contact 391, conductor 439, upper winding of relay 220 to battery; opens the minor switch release circuit at contact 396; connects the A lead to bank contact #1 of connector level of wiper 447 through contacts 394 and 377; and connects the A1 lead to bank contact #2 of wiper 447 through contacts 393 and 375*b*. As stated hereinbefore, the wiring for a three-trunk "0" group provides for the A lead to be wired to CN contact of trunk #1 in the group, A1 wired to CN of the trunk #2 and CN of trunk #3 is not wired because it is the last trunk in the group.

Relay 220 operates and locks itself from ground on contact 333*a*, through contacts 271, 285, 226, relay 230, upper winding of relay 220 to battery, but short circuits trunking relay 230; opens the locking circuit to relay 300 at contact 227; opens the connector restoring circuit at contact 228; closes a holding circuit from the C lead through lower winding of relay 200 through contact 252 to ground; and connects the upper winding of relay 410 to the pulsing lead 346 by closing contacts 222 so that it will stay operated from any pulses into the minor switch motor magnet 408 after relay 350 operates which ordinarily breaks its holding circuit at contact 357. Relay 350 operates and opens the lower winding of relay 410 at contact 357; removes dial tone from the calling line by opening contact 351*b*; and closes wiper 445 through contacts 424*a*, 415, 352, 341, 306, busy relay 280 to battery.

The ground on the normal, N contact of connector bank of wiper 447 passes through the wiper 447, contact 417, interrupter contact 434, connector motor magnet 433 to battery. The motor magnet operates and steps its wipers to contact #1. The first trunk of the "0" group is wired to bank contacts #1 of wipers 441, 443 and 445. If this trunk is busy, ground from the #1 CN bank contact will appear on lead A over contacts 394, 377 to ground contact of #1 of bank of wiper 447. This ground is extended from wiper 447, contacts 417, 434, 222 to hold relay 410 through its upper winding. The motor magnet 433 operates from this same ground and steps the wipers of the connector to contact #2. If this trunk is busy also, ground on the #2 CN contact will extend from the #2 bank contact to A1 and over contacts 393, 375*b*, #2 minor switch contact, wiper 447 and will act as described for contact #1 and hold relay 410 and step the connector motor magnet moving the connector wipers to contact #3. If the last trunk, too, is busy, the motor magnet will not step further since the CN contact is not wired thereto and busy relay 280 will operate over the CN lead from ground thereon through contacts 424*a*, 415, 352, 341, 306, relay 280 to battery and return busy tone to the calling line through closed contact 282. Relay 410 restores and locks busy relay 280 from ground through contact 333*a*, 271, 284, 414, 352, 341, 306, relay 280 to battery. The calling station continues to receive busy tone and holds the connection until he hangs up or until "permanent" timing releases the connection as described.

If one of the called trunks is idle, there will be no ground on the CN lead thereof to operate busy relay 280 or to step the connector wipers, and when relay 410 restores, the short circuiting of trunk relay 230 is removed by opening of ground at contact 413. Trunk relay 230 operates in series with relay 220 and locks to ground at contact 333*b* through contacts 271, 285 and 226. In operating, relay 230 closes contacts 232, 234 and 237 extending the plus and minus lines and C lead through to connector levels of wipers 441, 443 and 445. This completes the loop to the next succeeding switch. A trunk repeater seized over this loop from the calling station sends ground back over the CN lead. This ground will hold relays 120, 220, 230 and 200 operated, the circuit is traced from ground on CN and wiper 445, through contacts 424*a*, 416, conductor 256, contacts 336, 238, 226, for relays 230 and 220 to battery; and from contact 336 on through contacts 237, 204*a*, 205, 296, 213, for relay 200 to battery; and from contact 204*a*, wiper 169C lead, contacts 121, relay 120 to battery. Relay 120 holds relay 110 operated from ground through contact 123. At contact 236 relay 230 opens the circuit to slow-to-release relay 250. Extension of the + and — lines through to the repeater disconnects relay 240 which restores and opens the circuit to relay 250 at contact 241. Relay 250 being slow-to-release restores after an interval opening circuit to relay 270 at contact 251. Relay 270 being slow-to-release restores after an interval and opens the holding circuit of relay 390 at contact 276 and at contacts 271 disconnects the temporary holding ground at contacts 333*a*. Relay 390 restores and opens relay 350 at contact 395 which then restores. Transmission battery for a trunk call is furnished back to the calling station by the succeeding trunk repeater switch.

Since the switch ahead is held up over the calling line's loop just described, release is controlled by the calling station. When the calling station disconnects, the loop is open to the trunk repeater which restores, removing ground from the CN lead. Removal of this ground causes the operated relays 200, 220, 230, and 120 to release. Release of relay 230 closes a circuit to the minor switch release magnet 409 from ground through contacts 211*a*, 236, 273, 389, 396, 407, off-normal contact 432, release magnet 409 to battery, operating the release magnet which restores the minor switch wipers. Release of relay 220 closes contact 228 which places ground from contact 279*b*, continuing through contact 339 to all contacts on connector bank of wiper 448 except the normal contact N. Wiper 448 extends this ground to connector motor magnet 433 through interrupter contact 434 to operate said magnet and step the switch self interrupted until the wipers reach the twenty-sixth or normal contact. As there is no ground on this contact, the connector motor magnet cannot operate again. Battery from the motor magnet now appears at the associated allotter relay of the 170 series and operates such relay when the reset relay 100 next operates, reference being had to that portion of the local call hereinbefore describing the operation of the allotter. Since the finder switch has no home position it remains in its last operated position until assigned to a new call. The finder-connector link is now at normal and ready for the next call.

Dialing "9" trunks; one, two or three trunks may be accessed by dialing digit "9" as the first digit. These trunks may appear on contacts #1, #2 and #3 of connector banks of wipers 442, 444 and 446. Reference was made hereinbefore in regard to the possible connections of trunks. The operation of the equipment is the same for dialing "9" as for dialing "0" and reference may be had to the description thereof with exception that when the minor switch steps to the ninth contact responsive to the dial pulses, relay 400 operates from the ground on minor switch contact 9 of wiper 419 through relay 400 to battery. In operating, relay 400 closes ground from conductor 243 through contacts 402 and 427*a*, upper winding of relay 420 to battery operating relay 420. Relay 400 locks to ground on conductor 243 through its contact 403 and relay 420 locks through contact 427*b* and conductor 449, contact 229*b* to ground at contact 276. Relay 420 fully operates and closes contacts 421*b*, 423 and 424*b*, switching the outgoing normal leads to connector bank level of wipers 442, 444 and 446 respectively. Relay 400 also closes contacts 404 and 405 permitting leads B and B1 to be used as control normal leads for the first two trunks instead of leads A and A1. Lead B is connected to contact #1 of wiper 447's bank through contacts 405 and 377 while lead B1 is connected to bank contact #2 of wiper 447 through contacts 404 and 375*b*. If more than one "9" trunk is in the group, trunk hunting occurs upon encountering busy on the first trunk in the same manner as described for the "0" trunks.

Dialing "8" trunks: one or two trunks may be reached by dialing "8" as the first digit. These trunks may appear on contacts #2 and #3 of connector banks of wipers 442, 444 and 446 as described hereinbefore. The operation is the same for dialing "8" as for dialing "9" and reference may be had to the description thereof supra with the exception that the marking relay 380 operates from ground on minor switch contact #8 of wiper bank 419, through contact 355*a*, relay 380 to battery instead of relay 400. Relay 380 locks to ground on conductor 243 through its "X" contact 384 and fully operated closes contact 385 connecting the C terminal through contact 375*b* to contact #2 of connector bank of wiper 447 which is then used as the control normal lead therefore. Relay 380 at contacts 386 by way of contacts 377 grounds the #1 connector bank contact accessible to wiper 447 to cause the connector wipers to step to the second set of bank contacts from where the marking through the C terminal controls further stepping.

Besides these six single-digit switch-through trunks, two-digit switch-through trunk arrangements may be used where it is necessary to provide trunks or trunk groups in addition to the six trunks available on the single digit basis. The connector bank contacts assigned to the two-digit trunks are the first contacts in the fourth tens group, accessed by dialing the first digit "5." As many contacts may be used for two-digit trunks as desired, up to ten trunks. However, the number of two-digit trunks used will diminish by a like number, the number of subscriber lines available in the fourth tens group.

If only one trunk per two-digit group is desired, the Y lead off of the lower winding of relay 420 (Fig. 4) is wired to the proper contact on connector bank of wiper 447. For example, if only two single-trunk trunk groups are desired in these two groups, lead Y is wired to the contact 16 and 17 of wiper 447's bank. If three single-trunk trunk groups are desired, lead Y is wired to contacts 16, 17 and 18 of said bank. The first group is then accessed by dialing 51, the second 52 and so on, five indicating the fourth tens group in which the two-digit trunks fall and 1 or 2 designating the first or second trunk group therein and so on, all of which will be more fully described hereinafter.

If more than one two-digit trunk per group is desired, lead X off of the lower winding of relay 420 is wired to all bank contacts of wiper 447 representing trunks, except the last trunk in each group. This is so that the switch will stop at the end of a group when trunk hunting to be described in detail hereinafter. For example, if two-digit trunk groups are desired, the first having three trunks and the second having two trunks the X lead is connected to bank contacts 16 and 17 for the first group of three trunks, and to contact 19 for the second group of two trunks. Here again the X lead is used because of multiple trunk groups and the last contact in each group is left unwired for trunk hunting purposes.

In making a two-digit trunk call seizure of the finder-connector link and dialing the first and second digits is the same as described in the local call. It will be remembered that in response to dialing the first digit 5, marking relays 360 and 370 and wiper switching relay 429 are operated. When relay 340 restores after the last pulse of the second digit, the circuit to relay 300 is opened at contact 343 and ground is closed from conductor 243 through upper winding of relay 380, contacts 382$a$, 328, 428 to the X lead or from contact 428 through lower non-inductive winding of relay 420 to the Y lead. Wiper 447 will then extend this ground from either X or Y wiring through contact 417 and interrupter contact 434 through connector motor magnet 433 to battery. Relay 380 operates but motor magnet 433 does not since the current is insufficient for the later to operate, and locks to ground on conductor 243 through its "X" contact 384. Now fully operated, relay 380 opens its energizing circuit at contact 382$a$, and completes circuits from ground at contact 413 through contact 381, conductor 439, upper winding of relay 220 to battery and from ground through contacts 387 and 357, relay 350 to battery. Relay 220 operates and connects the upper winding of relay 410 through contact 222 to the connector pulsing circuit insuring the operation of relay 410 from any impulses into the connector motor magnet after operation of relay 360; and completes a locking circuit for relay 420 from ground through contact 229$a$ of relay 220, over conductor 449, contact 427$b$, upper winding of relay 420 to battery, which will hold relay 420 operated after relay 270 releases. Relay 350 operates and closes contact 352 connecting the connector wiper 446 through to busy relay 280 over the circuit described hereinbefore in the local call section. In so operating, relay 350 also opens the lower winding of relay 410 at contact 357. The busy test is made in the same manner as described in the local call. Relay 410 releases after a moment, and assuming that the first directory listed trunk is idle so that busy relay 280 is not operated, opens contact 417 separating wipers 447 and 448, and by removing direct ground from the upper winding of relay 220 at open contact 413 removes the short on trunk relay 230. Relay 230 operates in series with relay 220 and locks to ground on spring of relay 330 through contacts 333$a$, 271, 285 and 226; opens the circuit to slow-to-release relay 250 at contacts 236; prepares a holding circuit for relay 220 and itself by closing contact 238 from the CN lead of the connector through contacts 424$b$, 416, 336, 238 and 226 through said relays to battery; extends the + and − and C leads to the succeeding trunk circuit by closing contacts 232, 234 and 237 as described hereinbefore; and in opening contacts 231 and 233 opens the operating circuit of relay 240. The loop circuit from the calling subscribers phone through the finder-connector link seizes the trunk circuit connected to this switch. Seizure of the trunk circuit extends ground back over the CN lead of the connector switch for holding purposes. The holding circuit through the link has been traced hereinbefore. Relay 240 releases and further opens relay 250 at contact 241. Relay 250 restores after an interval and opens relay 270 at contacts 251 and 252 and leaves relay 200 held operated through its holding circuit which is from ground on the connector C lead from the succeeding trunk circuit, through wiper 446, contacts 424$b$, 416, conductor 256, contacts 336, 237, 204$a$, 205, 296, 224, lower winding of relay 200 to battery. Relay 270 restores and opens circuits to relay 360, 370 and 380 at contact 276. Relay 360 restores and opens the circuit to relay 350 at contact 367, and removes the ground from the motor start lead at contact 368. Relay 370 restores and removes ground from the normal contact N of connector wiper 447 at contact 378$a$. Relay 380 restores.

During the trunk call, only relays 110, 120, 200, 220, 230 and 420 are operated. Transmission battery is furnished back over the loop from the succeeding trunk circuit. The succeeding trunk circuit holds all the above mentioned relays operated. The calling subscriber has direct control of the succeeding trunk circuit and may release the connection by hanging up thereby removing the holding ground extending back from the trunk circuit.

Assuming now that the busy test has just been made during the interval that relay 410 holds up on its copper sleeve as described hereinbefore, and the single trunk of this group is busy, ground from the CN lead of the busy trunk then operates busy relay 280 over the circuit previously described. In operating, relay 280 extends the ground over the connector CN lead through contacts 424$b$, 415, 352, 341, 306, 283, 382$b$, 328, 428, lower non-inductive winding of relay 420, Y conductor, bank contact 16, connector wiper 447, contact 417, interrupter contact 434 through motor magnet 433 to battery and from interrupter contact 434 over conductor 346, contact 222 and upper winding of relay 410 to battery. Motor magnet 433 does not operate in series with the noninductive lower winding of relay 420 and the upper winding of relay 410 is shunted by battery through the winding of the motor magnet. Relay 410 restores and opens the circuit to its winding and the motor magnet just described at contact 415, permitting busy relay 280 to lock to ground on contact 333$a$ over a circuit described for such purpose in the local call. Relay 220 releases due to the opening of its circuit at open contact 413. Busy relay 280 closes contact 282 sending busy tone out over the calling loop also described in the local call.

Trunk hunting will occur where there is more than one trunk in a two-digit directory listed trunk group; and as explained hereinbefore, multiple trunk groups necessitate the use of the "X" wiring. All but the last trunk in the group has its connector bank contact on bank of wiper 447 connected through "X" wiring, contacts 428, 328, 382b to the spring of contact 283 on relay 280. If a trunk is busy, ground on the CN lead will operate busy relay 280 over the busy operating circuit described hereinbefore.

Assuming that the first trunk of the multiple two-digit trunk group is busy, busy relay 280 operates before relay 410 releases and extends its operating ground through contacts 283, 382b, 328, 428, over X wiring, connector wiper 447 and engaged bank contact, contact 417 and 434 through motor magnet 433 to battery and also from interrupter contact 434 over conductor 346, contact 222, upper winding of relay 410 to battery, connecting the motor magnet and relay 410 in parallel. This direct ground holds relay 410 operated and steps the connector motor magnet to the next trunk in the group. This busy test and movement of wipers continues until an idle trunk is found or the last trunk in the group is reached. When an idle trunk is found, the finder-connector link switches through in the same manner as described hereinbefore for an idle single trunk group.

Assuming that all trunks of the multiple trunk group are busy, and remembering that the last trunk in the group is not wired to its respective bank contact of connector wiper 447, when the wiper has stepped to this last busy trunk in the group, and the busy test is made, relay 280 operates but the motor magnet cannot step further since there is no ground circuit therefor. Relay 280 opens the minor switch pulsing circuit at contact 287 and closes contact 282 putting busy tone out on the line as described hereinbefore. Relay 410 restores and opens relay 220 at contact 413 and busy relay 280 locks itself to ground at contact 333a, described hereinbefore. Busy tone will remain on the calling station's line until the calling party releases or is timed out.

Incoming toll trunks also have access to these switches. The toll trunks terminate in regular line circuits. An incoming toll call operates the same as a local call except that if the line called is busy, sixty interruptions per minute flash busy is provided. This goes out on the toll trunk through finder banks of wipers 109 or 119 and out over a fifth conductor FB. This flash busy is closed when relay 200 is operated closing contact 201 and busy relay 280 is operated closing contact 281, and relay 410 has released after the busy test as described hereinbefore and closes contact 411 putting the sixty IPM flash busy out on the FB conductor to the toll operator.

Similarly, the free service trunks from nearby communities have access to these links. These trunks terminate on line circuits just as do the subscriber lines and toll trunks. The operation hereof is the same as for local subscriber lines.

Paystation originated calls operate the equipment the same as a local subscriber call except that paystation, PS, tone is placed on the C lead through a condenser 105. On calls to a toll operator, subsequent equipment will transfer this tone to the loop. In this forty line arrangement, equipment for two paystations is provided. The equipment is inserted by jumpering to any two subscriber lines desired.

*Overflow trunks*

The trunking arrangement in this exchange provides for overflow trunks under certain wiring conditions as well as providing for a common overflow trunk to serve two groups of trunks under other wiring conditions.

A common overflow trunk for an "8" trunk and for a "9" trunk is set out in Fig. 7 in which the third trunk, a "9" trunk, is common thereto. In this particular arrangement, the B lead is wired to the CN contact #1 of wiper 446 which is connected to a #9 trunk, the B1 lead is wired to ground, and the C lead is wired to the CN contact #2 to which an "8" trunk is connected. On the third CN contact of wiper 446 to which is connected a "9" trunk is the common trunk and is not wired. In such an arrangement, if "9" is dialled as the first digit, relays 400 and 420 operate, reference being had to the circuits described in the trunking section. Ground on the normal, N, contact of wiper 447 steps the connector wipers to the first bank contact in the same manner as described in the trunking section. The busy test is then made and if the "9" trunk is busy, ground on its CN bank contact which is wired to the B lead will appear on contact #1 of connector bank of wiper 447 and step the connector wipers to the next bank contact to which the "8" trunk has been connected. However, since the B1 lead has been wired to ground, this ground will appear on the second contact of wiper 447 through contacts 404 and 375b causing the connector motor magnet to automatically step the wipers to the third contact to which a "9" trunk is connected. This trunk is then the overflow for the first "9" trunk. If the digit 8 is dialled under this arrangement, relays 380 and 420 operate and the connector motor magnet steps the wiper 447 from ground on normal contact N of wiper 447, to the first bank contact as described in the section on trunking. Since ground appears on the first bank contact of wiper 447 through contacts 386 and 377, the motor magnet will step the wipers to the second bank contact to which the "8" trunk is connected. The busy test is now made and assuming this trunk to be busy, ground on the CN contact thereof because of the wiring described above appears on the C lead and through contacts 385 and 375b appears on the second bank contact of wiper 447. This steps the connector wipers to the third contact which is connected to the "9" overflow trunk. The "9" trunk on the third bank contact is therefore common to the "8" and "9" trunk groups providing overflow therefore when wired under the conditions specified.

Two combinations of overflow trunks are also shown in Figs. 5 and 6. In both examples, the "8" trunk is overflow for a "9" trunk call. In Fig. 5, the conditions are that B lead be wired to the #1 CN contact of connector wiper 446 to which is connected a #9 trunk and the #2 CN contact to which is connected an "8" trunk is wired to the C lead. The third CN contact, also an "8" trunk, is unwired. As described hereinbefore, when "9" is dialled and marking relays 400 and 420 operate, the wiper 447 steps to the first contact from the ground on normal contact, N. The busy test is made and assuming it to be busy, ground from the CN lead of the busy trunk is extended over the wiring to the B lead through contacts 405 and 377 to the first bank contact of wiper 447, stepping the connector wipers from this ground to the second bank contact, an "8" trunk. The wipers will remain on this contact and step no further, even though it is busy, since contact 365 is open, its relay not being responsive to a dialled "9" digit. This "8" trunk is therefore an overflow for the "9" trunk. Fig. 6 shows an "8" overflow trunk for a group of two "9" trunks. Assuming the both "9" trunks to be busy, ground from their respective CN leads through the B lead and then the B1 lead and contacts 405 and 404 respectively, which close responsive to a dialled "9" digit, will cause the connector to step its wipers to the third contact, an "8" trunk, for overflow.

*Alarm checking*

The instant system also provides testing means for alarms by dialing of the single digit "7" from a distant office. The circuit is seized exactly as described in the local call section. When the minor switch moves its wipers to the seventh contact, and relay 340 releases, ground from conductor 247 connected through contacts 359 and 344 to ground on conductor 243 appears on the seventh contact of minor switch top bank of wiper 419 and is extended by wiper 419 over conductor 451 through lower winding of relay 360 to battery. Relay 360 operates and locks to ground on conductor 243 through contact 363, lower winding to battery. Relay 360 closes motor start lead to ground through contacts 368 and 378b to start the interrupter and alarm equipment, and closes the alarm lead through contact 371, condenser 397, and contacts 361 through to the calling line or trunk. If a two-ring signal is heard, no alarms are present. Absence of such signal indicates an alarm is present. This test permits determination to the existence of an alarm condition at the unattended exchange by the wire chief at the distant attended exchange.

Having described my invention in detail, what I claim and desire to be protected by issuance of Letters Patent of the United States is.

What is claimed is:

1. In a telephone system, a plurality of groups of subscriber lines, a connector switch having access to said plurality of groups of lines for extending connections, an auxiliary switch having a plurality of bank contacts and a wiper therefor, means including an operating circuit to step said auxiliary switch responsive to a group of impulses transmitted thereto for positioning said wiper on the contact corresponding to the number of impulses transmitted; a plurality of marking relays each associated with certain of said contacts, operating circuits responsive to the positioning of said wiper on different ones of said contacts for operating said marking relays associated with said different ones of said contacts, a group of connector bank terminals for each group of lines, and means controlled by said marking relays so operated for marking all said connector bank terminals preceding the group of subscriber lines into which said connection is to terminate.

2. In a telephone system, a connector having a plurality of sets of wipers, a plurality of groups of subscriber lines accessible to said sets of wipers for extending connections thereto, an auxiliary switch having a wiper and a plurality of contacts; a plurality of marking relays each associated with certain of said contacts, means including a circuit to operate said auxiliary switch responsive to a group of impulses transmitted thereto for positioning said wiper on the contact corresponding to the number of impulses transmitted, operating circuits responsive to the positioning of said wiper on different ones of said contacts for operating said marking relays, means for selecting one of said sets of wipers over which the connection is to be completed, and marking circuits controlled by said marking relays so operated for marking said connector in accordance with the group of subscriber lines into which the connection is to terminate.

3. In a telephone system as claimed in claim 2, including means operated responsive to the positioning of said auxiliary switch wiper after the stepping thereof and after said marking has been accomplished for restoring said auxiliary switch, and circuit means effective in response to a second group of impulses for directively stepping said connector wiper sets to select a line in said marked group of lines.

4. In a telephone system as claimed in claim 2, including means operated responsive to the positioning of said auxiliary switch wiper and after said marking has been accomplished for restoring said auxiliary switch, means responsive to said restoration of said auxiliary switch for disabling said operating circuit of said auxiliary switch, means responsive to a second received group of impulses for directively stepping said connector wiper sets to select a line in said marked group of lines, means responsive to the termination of said second group of impulses for reestablishing said disabled operating circuit of said auxiliary switch, said re-established operating circuit of said auxiliary switch responsive to a third received group of impulses for reoperating said auxiliary switch to select the desired ringing code for said connection.

5. In a telephone system, a connector switch having a control wiper, a line wiper and respective control and line contact banks, the first and certain progressively succeeding contacts of said control bank forming single-contact groups, certain contacts of said line bank forming a multicontact group, said multi-contact group of said line bank immediately succeeding the last single-contact group of said control bank in the order of selection, an auxiliary switch having a marking wiper and an associated marking contact bank, relays connected to said marking bank contacts, means including a circuit to operate said auxiliary switch responsive to a received series of impulses for positioning said marking wiper on the marking bank contact corresponding to the number of received impulses, an operating circuit responsive to the positioning of said marking wiper on one of said marking bank contacts for operating one of said relays, circuits controlled by said operated relay for connecting marking potential to all but the last of the single-contact groups of said control bank, positioning means controlled by said operated relay for positioning said control and line wipers on the first contacts of said respective banks, said positioning means responsive to said control wiper contacting said marking potential on the first contact of said control bank for positioning said control and line wipers on the second contacts of said respective banks, said positioning means responsive to said control wiper progressively contacting said marking potential on said second and succeeeding contacts of said control bank for progressively positioning said control and line wipers on the contacts of said respective banks succeeding said second contacts until said control wiper contacts, said unmarked single-contact group of said control bank and said line wiper reaches the contact of said line bank immediately preceding said multi-contact group of said line bank, said positioning means ineffective to further move said line and control wipers when said control wiper contacts said unmarked single-contact group, whereby said line wiper is left engaged with said one contact of the line bank immediately preceding said multi-contact group of contacts.

6. A connector switch such as claimed in claim 5 including means effective after said wipers stop on said unmarked contact group for causing a second received series of impulses to operate said positioning means, said positioning means operated responsive to said second series of impulses to advance said line wiper from said unmarked contact group to a contact in said multi-contact group of said line bank, according to the number of impulses in said second series.

7. In a telephone system, a connector having a plurality of sets of wipers, an additional control wiper, a plurality of associated contact banks and a magnet, a plurality of groups of lines connected to certain of the bank contacts associated with said sets of wipers, the bank contacts associated with said control wiper being unmarked, an auxiliary switch having bank contacts, a wiper and a magnet, a circuit including an impulsing relay operated responsive to a received series of impulses for operating said auxiliary switch magnet to advance said auxiliary switch wiper to one of said auxiliary switch bank contacts, relays, means including one of said relays operated responsive to said positioning of said auxiliary switch wiper after said advancement for selecting the set of connector wipers over which the connection is to be completed, means including another of said relays operated responsive to said operation of said one relay for marking a plurality of the contacts of the bank associated with said control wiper in accordance with the value of said received series of impulses, means controlled by said operation of said other relay for advancing said control wiper and said selected set of connector wipers as a unit to cause said control wiper to connect with the first of said marked contacts, said advancing means responsive to said control wiper connecting with said first marked contact for further advancing said control wiper and said selected set of connector wipers to cause said control wiper to connect with the next marked contact, said advancing means responsive to said control wiper progressively connecting with said next marked contact and succeeding marked contacts for progressively advancing said control wiper and said selected set of connector wipers to cause said control wiper to connect with an unmarked contact immediately following the last marked contact, and to cause said selected set of connector wipers to connect with the respective bank contacts immediately preceding the respective contacts associated with the group of lines into which group connection is desired, said advancing means ineffective when said control wiper connects with said one unmarked contact, said control wiper remaining on said one unmarked contact and said selected set of connector wipers on said respective contacts immediately preceding said respective contacts associated with said one group of lines, means including said impulsing relay thereafter operated responsive to a second received series of impulses for correspondingly operating said connector magnet, and means responsive to said operation of said connector magnet for advancing said selected set of connector wipers from said respective contacts immediately preceding the respective contacts associated with said one group of lines to the respective contacts associated with one line of said one group of lines, in accordance with the value of said second received series of impulses.

8. In a telephone system, a connector having a plurality of sets of wipers for extending connections, a group of trunks accessible to one of said sets of wipers, said group of trunks identified by a single-digit code, an auxiliary switch having a wiper, a magnet and a plurality of contacts, one of said contacts corresponding to said group of trunks, a circuit including an impulse relay operated responsive to a received series of impulses corresponding to the single-digit code of said group of trunks for operating said magnet to cause the positioning of said auxiliary switch wiper on said one contact, a marking relay associated with said one contact, a circuit completed for operating said marking relay in response to said positioning of said auxiliary switch wiper, marking circuits completed responsive to said operation of said marking relay for marking on said connector at least the first trunk of said group of trunks, means responsive to said operation of said marking relay for selecting the set of connector wipers having access to said group of trunks, and means responsive to said operation of said marking relay for causing the automatic advancement of said selected set of connector wipers to the marked first trunk of said group of trunks.

9. The telephone system claimed in claim 8 wherein said marking circuits completed responsive to said operation of said marking relay marks on said connector the first and second trunks of said group of trunks, together with means for busying said marked first trunk, and means responsive to said selected set of connector wipers contacting said busied marked first trunk for causing said selected set of connector wipers to be advanced to said marked second trunk.

10. In a telephone system, a connector switch having two sets of wipers for extending connections, a first group of trunks accessible to one of said sets of wipers, a second group of trunks accessible to said other set of wipers, each said group of trunks identified by a different single-digit code, an auxiliary switch having a wiper and a plurality of contacts, one of said contacts representing said first group of trunks, another of said contacts representing said other group of trunks, means including a circuit operated responsive to a received series of impulses corresponding to the single-digit code of either one or the other of said groups of trunks for correspondingly positioning said auxiliary switch wiper on said one contact or said other contact according to the value of said received series of impulses, marking relays connected to said one and said other contacts, a circuit completed responsive to said positioning of said auxiliary switch wiper for operating the marking relay connected to said selected contact, marking circuits completed responsive to said operation of said one marking relay for marking on said connector switch the first trunk of said first group of trunks or the first trunk of said second group of trunks according to the value of said selected contact, means responsive to said operation of said one marking relay for selecting the set of connector switch wipers having access to the marked group of trunks, and means responsive to said operation of said one marking relay for causing the automatic advancement of said selected set of connector switch wipers to the marked first trunk.

PIER BAKKER.

References Cited in the file of this patent

UNITED STATES PATENTS

| Number | Name | Date |
|---|---|---|
| 2,190,140 | Taylor | Feb. 13, 1940 |
| 2,416,109 | Long | Feb. 18, 1947 |
| 2,504,708 | Long | Apr. 18, 1950 |
| 2,513,949 | Long | July 4, 1950 |
| 2,529,471 | Long | Nov. 7, 1950 |
| 2,548,673 | Long | Apr. 10, 1951 |